(12) United States Patent
Kavidayal et al.

(10) Patent No.: US 10,621,764 B2
(45) Date of Patent: Apr. 14, 2020

(54) COLORIZING VECTOR GRAPHIC OBJECTS

(71) Applicant: Adobe Inc., San Jose, CA (US)

(72) Inventors: Mridul Kavidayal, Noida (IN); Vineet Batra, Pitam Pura (IN); Jingwan Lu, Santa Clara, CA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 87 days.

(21) Appl. No.: 16/028,075

(22) Filed: Jul. 5, 2018

(65) Prior Publication Data

US 2020/0013205 A1 Jan. 9, 2020

(51) Int. Cl.
| | | |
|---|---|---|
| G06T 11/40 | (2006.01) | |
| G06N 3/08 | (2006.01) | |
| G06N 3/04 | (2006.01) | |
| G06T 11/00 | (2006.01) | |

(52) U.S. Cl.
CPC ............ *G06T 11/40* (2013.01); *G06N 3/0454* (2013.01); *G06N 3/084* (2013.01); *G06T 11/001* (2013.01); *G06T 2207/20081* (2013.01)

(58) Field of Classification Search
None
See application file for complete search history.

(56) References Cited

U.S. PATENT DOCUMENTS

| | | |
|---|---|---|
| 10,482,607 B1 | 11/2019 | Walters et al. |
| 2002/0003897 A1 | 1/2002 | Tanaka |
| 2005/0240886 A1* | 10/2005 | Bonges, III ......... G06F 17/5081 716/115 |
| 2006/0133699 A1 | 6/2006 | Widrow et al. |
| 2010/0197400 A1 | 8/2010 | Geiss |
| 2011/0050864 A1 | 3/2011 | Bond |
| 2013/0044945 A1 | 2/2013 | Nykyforov |
| 2015/0055875 A1 | 2/2015 | Kawaguchi et al. |

(Continued)

FOREIGN PATENT DOCUMENTS

| | | |
|---|---|---|
| CN | 106156700 | 11/2016 |
| EP | 3480786 | 5/2019 |
| GB | 2571307 | 8/2019 |

OTHER PUBLICATIONS

"Vector Magic: Convert JPG, PNG images to SVG, EPS, AI vectors", Retrieved at: https://vectormagic.com/—on Apr. 26, 2018, 10 pages.

(Continued)

*Primary Examiner* — Aaron M Richer
(74) *Attorney, Agent, or Firm* — SBMC

(57) ABSTRACT

There is disclosed a system and method for colorizing vector graphic objects in a digital medium environment. The system comprises a processing unit and a deep neural network of the processing unit, in which the deep neural network includes a generator. The processing unit receives a non-colorized vector image and converts the non-colorized vector image to a non-colorized raster image. The deep neural network generates a colorized raster image from the non-colorized raster image. The generator processes the non-colorized raster image using an extended number of convolutional layers and residual blocks to add skip connections between at least two of the convolutional layers. The processing unit converts the colorized raster image to a colorized vector image.

20 Claims, 8 Drawing Sheets
(2 of 8 Drawing Sheet(s) Filed in Color)

(56) References Cited

U.S. PATENT DOCUMENTS

| | | | |
|---|---|---|---|
| 2017/0098326 A1 | 4/2017 | Wampler | |
| 2018/0075581 A1* | 3/2018 | Shi | G06T 3/4053 |
| 2018/0150947 A1* | 5/2018 | Lu | G06N 3/0454 |
| 2018/0189951 A1 | 7/2018 | Liston et al. | |
| 2018/0218198 A1* | 8/2018 | Hushchyn | G06K 9/00201 |
| 2018/0293501 A1* | 10/2018 | Ambati | G06N 5/02 |
| 2019/0080456 A1* | 3/2019 | Song | G06N 3/00 |
| 2019/0139191 A1* | 5/2019 | Liu | G06T 3/4046 |
| 2019/0261717 A1 | 8/2019 | Schultz et al. | |
| 2019/0355154 A1 | 11/2019 | Batra et al. | |
| 2019/0385302 A1 | 12/2019 | Ngo Dinh et al. | |
| 2019/0392196 A1 | 12/2019 | Saganos et al. | |
| 2020/0005511 A1 | 1/2020 | Kavidayal et al. | |

OTHER PUBLICATIONS

"Buy Adobe Illustrator CC | Vector graphic design software", Retrieved at: https://www.adobe.com/in/products/illustrator.html—on Apr. 26, 2018, 8 pages.

Arbelaez,"Contour Detection and Hierarchical Image Segmentation", Retrieved from <http://www.cs.berkeley.edu/~arbelaez/publications/amfm_pami2011.pdf> on Nov. 28, 2012, May 2011, 20 pages.

Au,"Skeleton Extraction by Mesh Contraction", ACM Trans. Graph., 27(3):44:1{44:10, Aug. 2008, 10 pages.

Batra,"Colorization of Vector Images", U.S. Appl. No. 15/981,496, filed May 17, 2018, 38 pages.

Gucluturk,"Convolutional Sketch Inversion", Jun. 9, 2016, 15 pages.

Gulrajani,"Improved Training of Wasserstein GANs", Dec. 25, 2017, 20 pages.

He,"Deep Residual Learning for Image Recognition", Dec. 10, 2015, 12 pages.

Isola,"Image-to-Image Translation with Conditional Adversarial Networks", Nov. 22, 2017, 17 pages.

Johnson,"Perceptual Losses for Real-Time Style Transfer and Super-Resolution.", Mar. 27, 2016, 18 pages.

Pathak,"Context Encoders: Feature Learning by Inpainting", CVPR 2016, Nov. 21, 2016, 12 pages.

Ronneberger,"U-Net: Convolutional Networks for Biomedical Image Segmentation", May 18, 2015, 8 pages.

Sangkloy,"Scribbler: Controlling Deep Image Synthesis with Sketch and Color", Dec. 5, 2016, 13 pages.

Wilber,"BAM! The Behance Artistic Media Dataset for Recognition Beyond Photography", Computer Vision and Pattern Recognition (cs.CV), Apr. 27, 2017, 10 pages.

Wu,"Deep Convolutional Neural Network with Independent Softmax for Large Scale Face Recognition", In Proceedings of the 2016 ACM on Multimedia Conference, MM '16, Oct. 1, 2016, 5 pages.

Zhang,"Colorful Image Colorization", Oct. 5, 2016, 29 pages.

"Combined Search and Examination Report", GB Application No. 1905846.0, dated Sep. 30, 2019, 9 pages.

"First Action Interview Office Action", U.S. Appl. No. 16/022,387, dated Oct. 28, 2019, 3 pages.

"Pre-Interview First Office Action", U.S. Appl. No. 16/022,387, dated Sep. 20, 2019, 3 pages.

"Generative adversarial network", downloaded from https://en.wikipedia.org/wiki/Generative_adversarial_network—on Apr. 25, 2018, 3 pages.

Asente,"Dynamic Planar Map Illustration", ACM Transactions on Graphics (TOG)—Proceedings of ACM SIGGRAPH 2007; vol. 26 Issue 3, Jul. 2007., Jul. 2007, 10 pages.

"Notice of Allowance", U.S. Appl. No. 16/022,387, dated Jan. 24, 2020, 12 pages.

"Corrected Notice of Allowability", U.S. Appl. No. 16/022,387, dated Jan. 30, 2020, 2 pages.

"Pre-Interview First Office Action", U.S. Appl. No. 15/981,496, Feb. 4, 2020, 3 pages.

\* cited by examiner

COLORIZING VECTOR GRAPHIC OBJECTS

BACKGROUND

Computing tools, such as computers, tablets, mobile devices, and cloud services, are widely used to create artworks including images, videos, and multimedia, for desirable experiences by users. Artworks many include many components such as raster images and vector images. Raster images, also referred to as bitmap, are represented by an array of pixels within a grid of pixels. Vector images are represented by straight and/or curved path, such as lines, shapes, and other graphic components, formatted by geometric formulas. Depending on the artwork, it may be advantageous to include raster images, vector images, or a combination of both.

Colorization of vector graphic artworks is a non-trivial task, and even a simple figure may contain hundreds of paths. Typically, a user must select and colorize an individual path based on hue, saturation, tone and contrast. The user must also keep in mind the colors already assigned as well as the desired result. In order to achieve desired balance and harmony in the colorized results, multiple iterations may be involved where different colors are assigned to each path in multiple steps. This task is time-consuming and requires a lot of attention to detail.

Some challenges of colorization may be addressed using convolutional neural networks. These techniques sidestep the traditional graphics rendering pipeline and, instead, generate imagery at the pixel level by learning from large collections of photos (e.g., faces or bedrooms). However, many of these techniques are of limited practical use since these techniques are trained based on images belonging to a single class (for example, shoes and faces). Even those techniques that work for multiple classes require a grayscale version as input. Thus, existing techniques do not perform well with colorizing images in the wild, i.e. a broad scope of image categories.

SUMMARY

This system and method for colorizing vector graphic objects addresses the short-comings described above. In order to allow for great variation in the input distribution of images, the learning capacity of the deep neural network is expanded and includes residual blocks with skip connections between convolutional layers. The use of residual blocks eases the training of the deep neural network and improves the capability of the network for more complex tasks. Also, management of perceptual loss of the deep neural network during training, separate from the other loss functions, results in significant performance advantages.

One aspect is a technique for colorizing vector graphic objects using deep learning in a digital medium environment. A non-colorized vector image is received at a graphics processing unit, and the non-colorized vector image is converted to a non-colorized raster image at the graphics processing unit. Next, a colorized raster image is generated from the non-colorized raster image at the graphics processing unit based on a deep neural network, in which the non-colorized raster image is processed at a generator of the deep neural network using an extended number of convolutional layers and residual blocks to add skip connections between at least two of the convolutional layers. The colorized raster image is then converted to a colorized vector image at the graphics processing unit.

Another aspect is a system for colorizing vector graphic objects in a digital medium environment comprising a graphics processing unit and a deep neural network of the graphics processing unit, in which the deep neural network includes a generator. The graphics processing unit receives a non-colorized vector image and converts the non-colorized vector image to a non-colorized raster image. The deep neural network generates a colorized raster image from the non-colorized raster image. The generator processes the non-colorized raster image using an extended number of convolutional layers and residual blocks to add skip connections between at least two of the convolutional layers. The graphics processing unit converts the colorized raster image to a colorized vector image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

DETAILED DESCRIPTION

Figure 1:
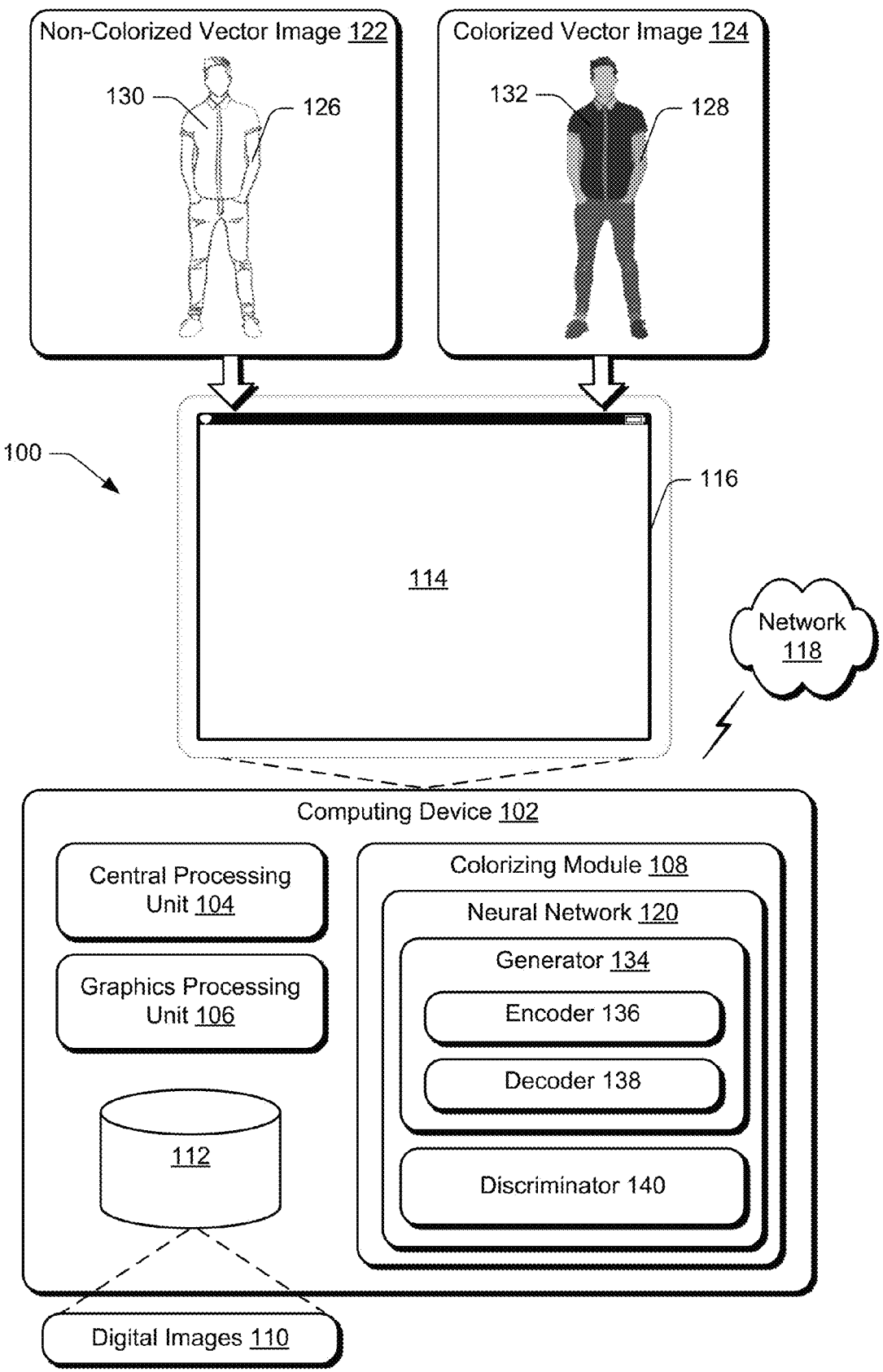
FIG. 1 is an illustration of an environment in an example training implementation that is operable to employ digital image colorization techniques described herein.

While the present invention is susceptible of embodiment in various forms, there is shown in the drawings and will hereinafter be described presently embodiments with the understanding that the present disclosure is to be considered an exemplification of the invention and is not intended to limit the invention to the specific embodiments illustrated. One skilled in the art will hopefully appreciate that elements in the figures are illustrated for simplicity and clarity and have not necessarily been drawn to scale. For example, the dimensions of some of the elements in the figures may be exaggerated relative to other elements with the intent to help improve understanding of the aspects of the embodiments being illustrated and described.

Overview

Conventional techniques used by a computing device to colorize graphic images of vector objects are confronted with a variety of challenges that may not yield acceptable results. Conventional colorization techniques, for instance, target a limited, i.e., single, category of input images, such as bags, shoes, etc. These techniques also are designed for image-to-image translation of inputs with high correlation and similar spectrum. For these reasons, conventional colorization techniques have difficulty with learning the notion of flood-fill, where a single color is assigned to fill a closed area bounded by contours, such as an outline of a graphic object. Further, these techniques lack the ability to learn sufficiently feature specific coloring for regions enclosed by outlines, such as appropriate colors for hair, clouds, and the sky.

Accordingly, neural networks utilizing enhanced colorization techniques over conventional techniques are described. The learning capacity of the colorization technique is significantly deeper to manage the great variation in the input distribution. Since the depth of the neural network is increased significantly, a skip architecture is implemented to minimize loss and facilitate gradient flow. Also, Perceptual loss is added to the objective function in neural network to assist with capturing the notion of flood-fill and enable colorization within an outline of a graphic object. In addition, hyperparameter tuning is applied during operation of the neural network, particularly the Perceptual loss relative to the other parameters, to provide stability and enhance performance.

Image colorization may be formulated as an image translation process that may utilize deep learning. A given image belonging to the distribution of images 'A' may be translated to the distribution of images 'B'. For colorization of vector images, the set 'A' would be outline images of objects and the set 'B' would be their corresponding colored images. In order to create a system and method for colorizing broad categories of real world images, a deep neural network may be utilized. For the process of vector image colorization, a non-colorized vector representation of an input image is converted to a non-colorized raster representation, a colorized raster representation is generated from the non-colorized raster representation using a deep neural network, and the colorized raster representation is converted to a colorized vector representation.

A conditional Generative Adversarial Network (GAN) may be used to address image translation, and a particular type of conditional GAN for vector image colorization is described herein. A deep neural network for the conditional GAN is utilized to ensure processing of a broad category of real world images. Also, the conditional GAN includes a residual connection that uses skip layers allowing network blocks to learn only the residual component. The use of residual block eases the training of the deep neural network and improves the capability of the neural network for more complex tasks.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example training implementation that is operable to employ colorization techniques described herein. It is to be understood that variations of this digital medium environment 100 may apply to other implementations beyond training. The illustrated environment 100 includes a computing device 102, which may be configured in a variety of ways. The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

The computing device 102 is illustrated as including a central processing unit 104 and a graphics processing unit 106. The central processing unit 104 includes a few cores supported by cache memory to handle a limited number of threads for processing. The graphics processing unit 106 is a more specialized processor that includes hundreds of cores to handle thousands of threads simultaneously. The central processing unit 104 is capable of handling a variety of general tasks in a reasonable manner, whereas the graphics processing unit 106 is capable of handling certain specialized tasks more quickly and efficiently than the central processing unit. Since graphic processing requires a lot of repeated mathematical operations, the graphics processing unit 106 is well suited to handle image and video rendering. By allocating tasks appropriately between the central processing unit 104 and the graphics processing unit 106, the computing device 102 is capable of running efficiently to provide a desirable experience for a user. The system and method of colorization described herein would be better performed by the graphics processing unit 106. However, it is to be understood that the central processing unit 104 may perform at least some of the tasks for colorization, particularly for a more powerful central processing unit and/or a central processing unit that includes graphics processing capabilities.

The computing device 102 is illustrated as further including a colorizing module 108 to process and transform a digital image 110, which is illustrated as maintained in storage 112 of the computing device. Such processing includes creation of the digital image 110, modification of the digital image 110, and rendering of the digital image 110 in a user interface 114 for output, e.g., by a display device 116. Although illustrated as implemented locally at the computing device 102, functionality of the image processing system may also be implemented as whole or part via functionality available via the network 118, such as part of a web service or "in the cloud."

The colorizing module 108 includes a neural network 120, such as a deep neural network having an extended architecture to handle complex tasks for a broad category of real world images. The neural network 120 is a system of hardware and software components, including a large number of parallel processors, arranged to process an interconnection of nodes in the form of tiers or layers. In addition to an input layer and an output layer, the neural network includes many hidden layers therebetween. The numerous connections between these layers represent weights and bias, and the neural network is trained by adjusting these weights and/or bias as training data is fed through the neural network. By processing the training data, the neural network develops a loss function, which includes multiple loss parameters, to measure of the amount of error of linear regression and indicate how well the neural network performs for certain task. The neural network is capable of learning, i.e., improving task performance automatically without human intervention, by adjusting the weights and/or biases based on the loss function.

The colorizing module 108 implements functionality to convert a non-colorized vector image 122 to a colorized vector image 124. A colorized vector image differs from a non-colorized vector image in that at least one or more elements of the colorized vector image includes more color than the corresponding element or elements of the non-colorized image. For example, as shown in FIG. 1, the non-colorized vector image 122 is shown in two colors, namely black and white, whereas the colorized vector image 124 is shown in multiple colors, i.e., more than two colors, of the image. With regard to vector graphic objects, the color within outlined areas are of special interest. Again, as shown in FIG. 1, the non-colorized vector image 122 shows a white "blank" area 126 with the outline representing the person's left arm, whereas the colorized vector image 124 shows a non-white (non-blank) 128, i.e., flesh-color shading, within the outline. Likewise, the non-colorized vector image 122 shows a white "blank" area 130 with the outline representing the person's shirt, whereas the colorized vector image 124 shows a non-white (non-blank) color 132, i.e., blue shading, within the outline.

The neural network 120 addresses the image translation from the non-colorized vector image 122 to the colorized vector image 124. One type of neural network 120, specifically a conditional Generative Adversarial Network (GAN) is illustrated by FIG. 1. As such, the neural network 120 includes a generator 134 having an encoder 136 and a decoder 138 as well as a discriminator 140. Other types of neural networks may or may not includes these same elements at the conditional GAN shown in the figure.

Digital Image Colorization

Figure 2:
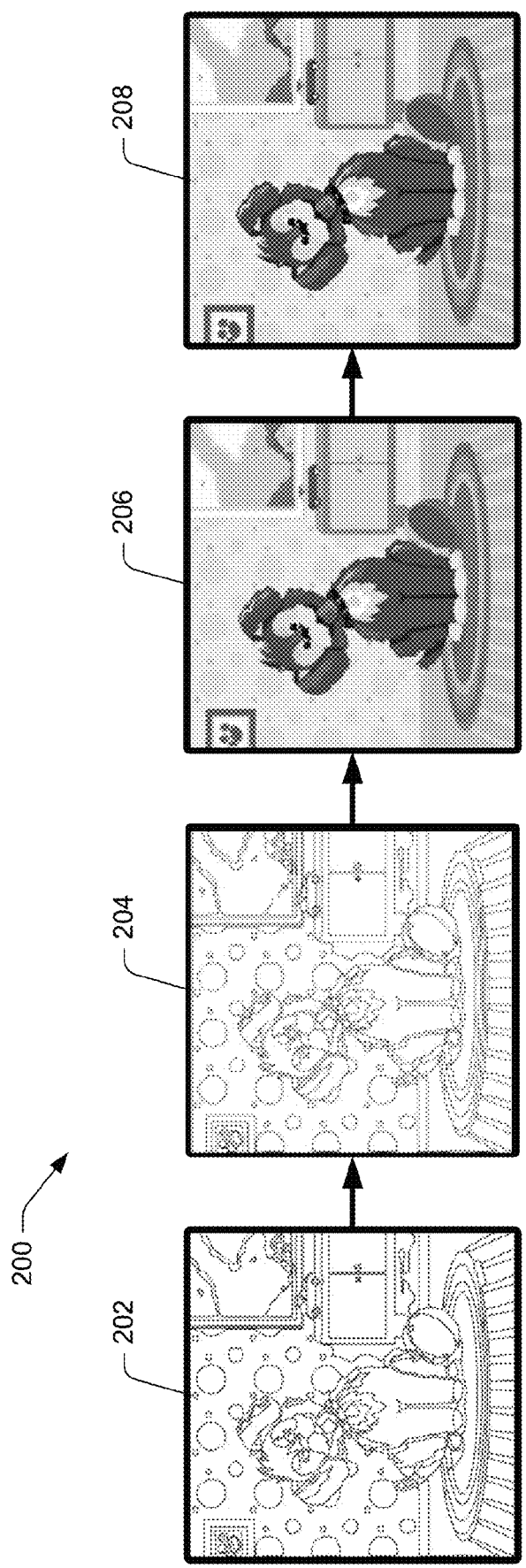
FIG. 2 is a flow diagram depicting a procedure in an example implementation of the digital image colorization techniques as applied to vector graphic objects.

FIG. 2 illustrates a procedure representing the digital image colorization techniques as applied to vector graphic objects. Referring to FIG. 2, a non-colorized vector image 202 is received at a processing unit, such as the graphics processing unit 106, and the non-colorized vector image is converted to a non-colorized raster image 204 at the processing unit. Next, the non-colorized raster image 204 is processed at the processing unit based on a deep neural network to generate a colorized raster image 206. The colorized raster image 206 is then converted to a colorized vector image 208 at the processing unit. Accordingly, when the processor generates the colorized raster image 206 from the non-colorized raster image 204, the deep neural network optimizes the digital image colorization techniques based on the vector-to-raster conversion before colorization and/or the raster-to-vector conversion after colorization.

Figure 3A:
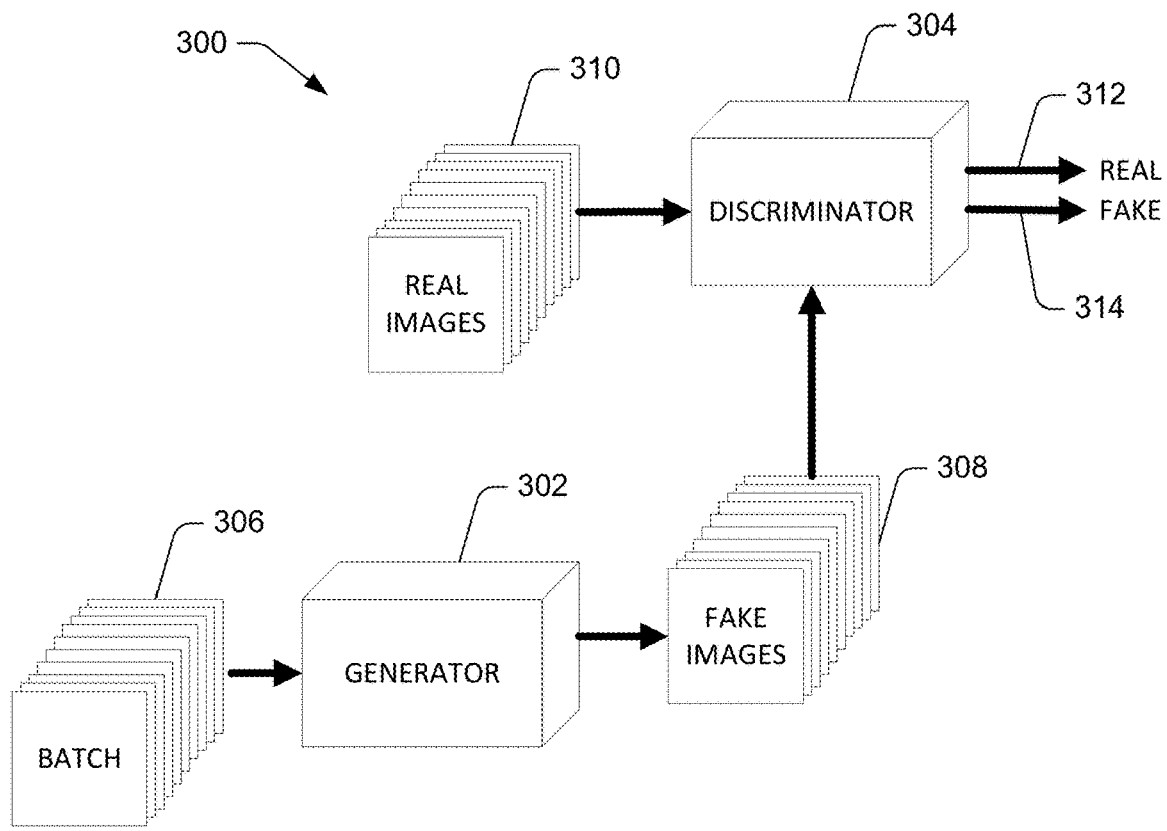
FIG. 3A is a flow diagrams depicting a procedure in an example training implementation of a conditional Generative Adversarial Network (GAN) operable to employ the digital image colorization technique.
Figure 3B:
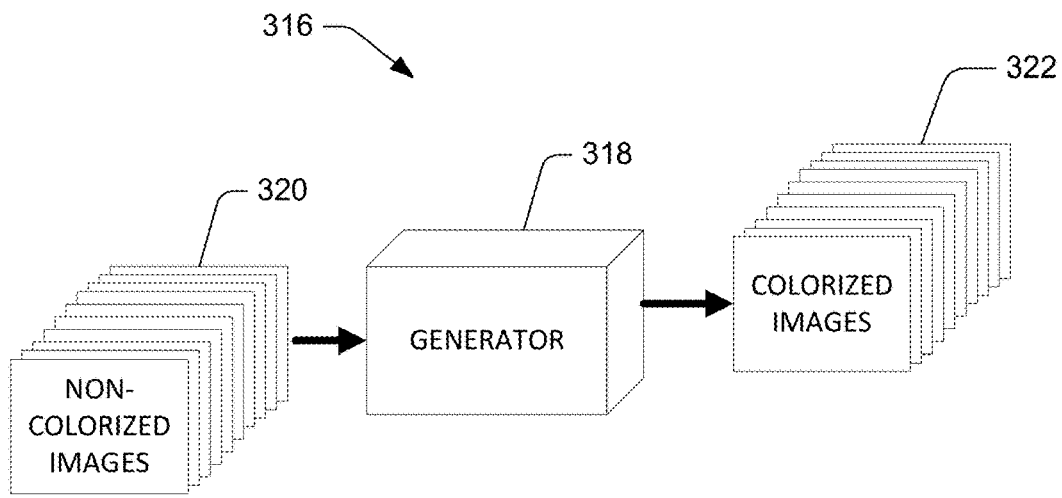
FIG. 3B is a flow diagrams depicting a procedure in an example testing implementation of a conditional Generative Adversarial Network (GAN) operable to employ the digital image colorization technique.

FIGS. 3A and 3B represent procedures in example implementations of a deep neural network 300 operable to employ the digital image colorization technique. FIG. 3A, in particular, represents a procedure in an example training implementation of the deep neural network 300. The deep neural network 300 is a conditional Generative Adversarial Network (GAN) to address the translation of non-colorized vector images to colorized vector images. The deep neural network 300 pits two convolutional networks against each other, thus creating an adversarial relationship. One convolutional network, referred to as a generator 302, generates new instance of data, whereas the other convolutional network, referred to as a discriminator 304, determines the authenticity of the generated instance of data. For the deep neural network 300, the generator 302 receives an input 306, such as a batch of representative images, and generates corresponding fake images 308. The discriminator 304 receives an input of real images 310 and the fake images 308 from the generator 302 and, based on the received information from both sources, determines whether each image is real or not real, and generates an output 312, 314 accordingly. Real images 310 are those that fall into the domain of colorized images. The generator 302 will try to fool the discriminator 304 by creating images a close to colorized images as possible.

A conditional GAN employed for the digital image colorization technique described herein, in which the discriminator, is conditioned upon the colorized image only and not on both the outline and the colorized image like other conditional GANs. By focusing on the colorized image, the problems with overly constraining the generated coloring is avoided, as the same set of outlines can have possibly many different colorings. The use of this type of conditional GAN allows the training process to be more stable and the loss to converge faster.

FIG. 3B represents a procedure in an example testing implementation of a deep neural network 316 operable to employ the digital image colorization technique. The generator 318 of FIG. 3B is trained to handle a broad category of real world images, not just a single or limited class, since the generator has been developed through the procedure and/or deep neural network 300 of FIG. 3A. The trained generator 318 of the deep neural network 316 may be tested by providing an input 320 of non-colorized images and reviewing an output 322 of colorized images. Based on the output 322 of the trained generator 318, the generator may be subjected to more training or implemented in a product for user operation.

Figure 4:
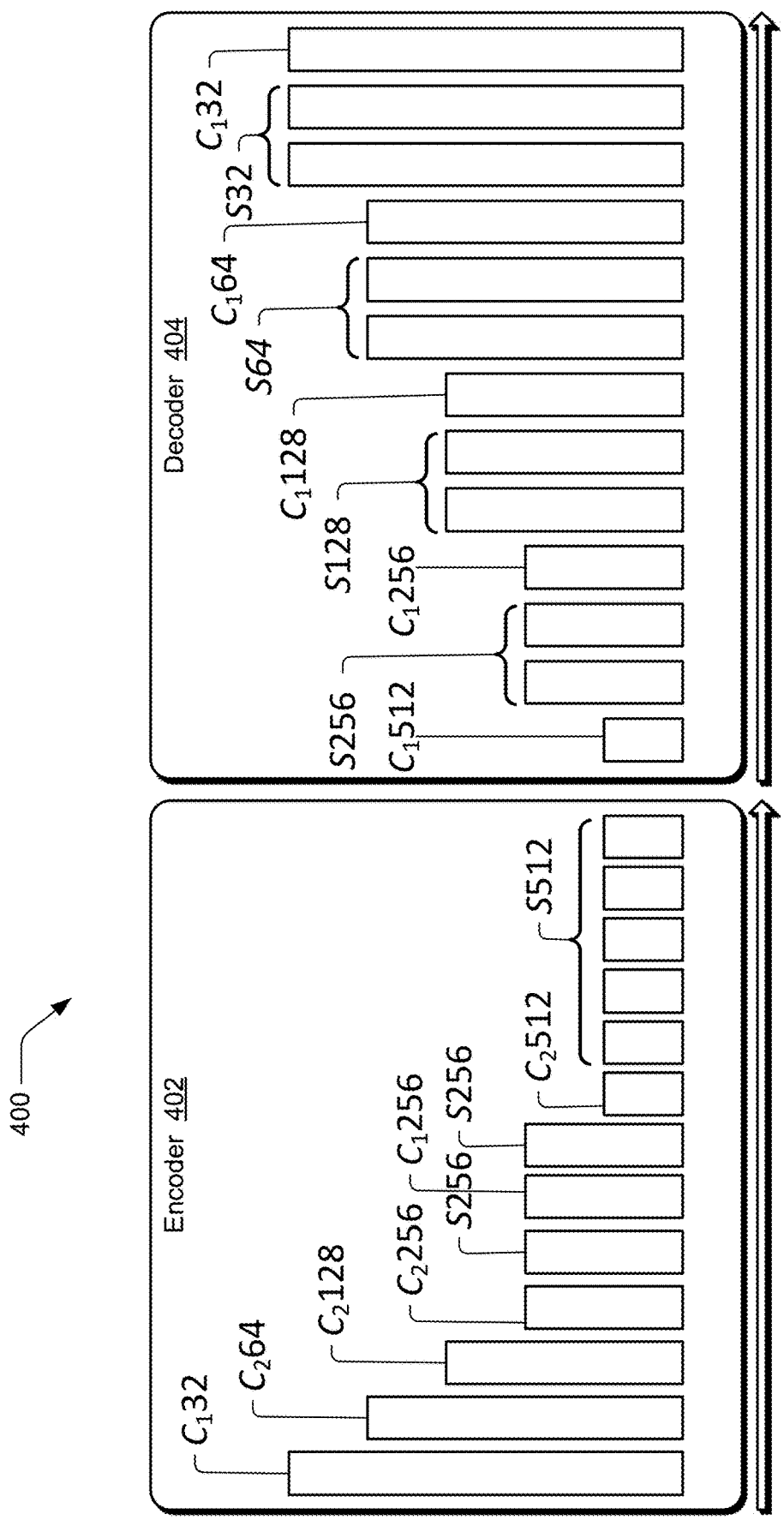
FIG. 4 is a visual representation of an example implementation of a generator architecture for the conditional GAN operable to employ the digital image colorization technique.

Referring to FIG. 4, there is shown a visual representation of an example implementation of a generator architecture 400 for the conditional GAN 300 operable to employ the digital image colorization technique. It is to be understood that this figure is merely an abstract representation which is not drawn to scale and does not provide any indication of the relative values or importance of the various parts of the generator architecture.

The generator 302 of the conditional GAN 300 represents a deep neural network 120 for application to a broad category of real world images. The generator 302 is more than a deep neural network that stacks convolutionally layers. Deep neural networks become difficult to train due to the fact that the gradient is back-propagated to earlier layers, making the gradient very small. As the neural network is extended, the performance becomes saturated and degrades rapidly. For that reason, the deep neural networks 120 of the conditional GAN 300 incorporate residual connection that use skip layers allowing network blocks to learn only the residual component. The use of residual block eases the training of deep networks which improve the capability of the neural network for more complex tasks.

The generator 302 of the conditional GAN 300 is a network that generates the image, and the discriminator 304 is a network of the conditional GAN which tries to distinguish whether the generated images are actually real or fake. The generator 302 of the conditional GAN 300 of the deep neural network 120 includes an encoder block 402 and a decoder block 404. The deep neural network 120 receives a non-colorized image input and generates a colorized image output of similar resolution. Thus, the input 306 to the generator 302 is a batch of images down sampled multiple times to a lower dimension, processed by a sequence of non-linear transformations, and then up sampled to the desired output size. As an example, the encoder 402 for the generator 302 may be based on the following architecture:

$$C_1 32\text{-}C_2 64\text{-}C_2 128\text{-}C_2 256\text{-}S256\text{-}C_1 256\text{-}S256\text{-}C_2 512\text{-} \\ S512\text{-}S512\text{-}S512\text{-}S512\text{-}S512 \quad (1)$$

and the decoder 404 for the generator may be based on the following architecture:

$$C_1 512\text{-}S256\text{-}S256\text{-}C_1 256\text{-}S128\text{-}S128\text{-}C_1 128\text{-}S64\text{-}S64\text{-} \\ C1 64\text{-}S32\text{-}S32\text{-}C_1 32 \quad (2)$$

where $C_i k$ denotes a Convolution-BatchNorm-RELU layer with k filters convolved with a stride of i and Sk denotes a residual block with Skip Layer (Convolution-BatchNorm-RELU-Convolution-BatchNorm-RELU). The residual block may be described as two convolutional blocks short-circuited. A Skip Layer represents an architecture of skipping of one or more layers in the neural network and feeding the output of one layer as an input to the next layer as well as some other layer. For example, one input may be fed to a particular Convolution-BatchNorm-RELU-Convolution-BatchNorm-RELU block, and another input may be directed to the output of that block. For architectures (1) and (2) above, all convolutions in the encoder are 3×3 spatial filters and all de-convolutions in the decoder involve convolutions with 3×3 spatial filters and a stride 1 followed by bilinear up sampling, except the last layer to avoid artifacts. Therefore, for this example, convolutions in the decoder up sample by a factor of 2.

Figure 5:
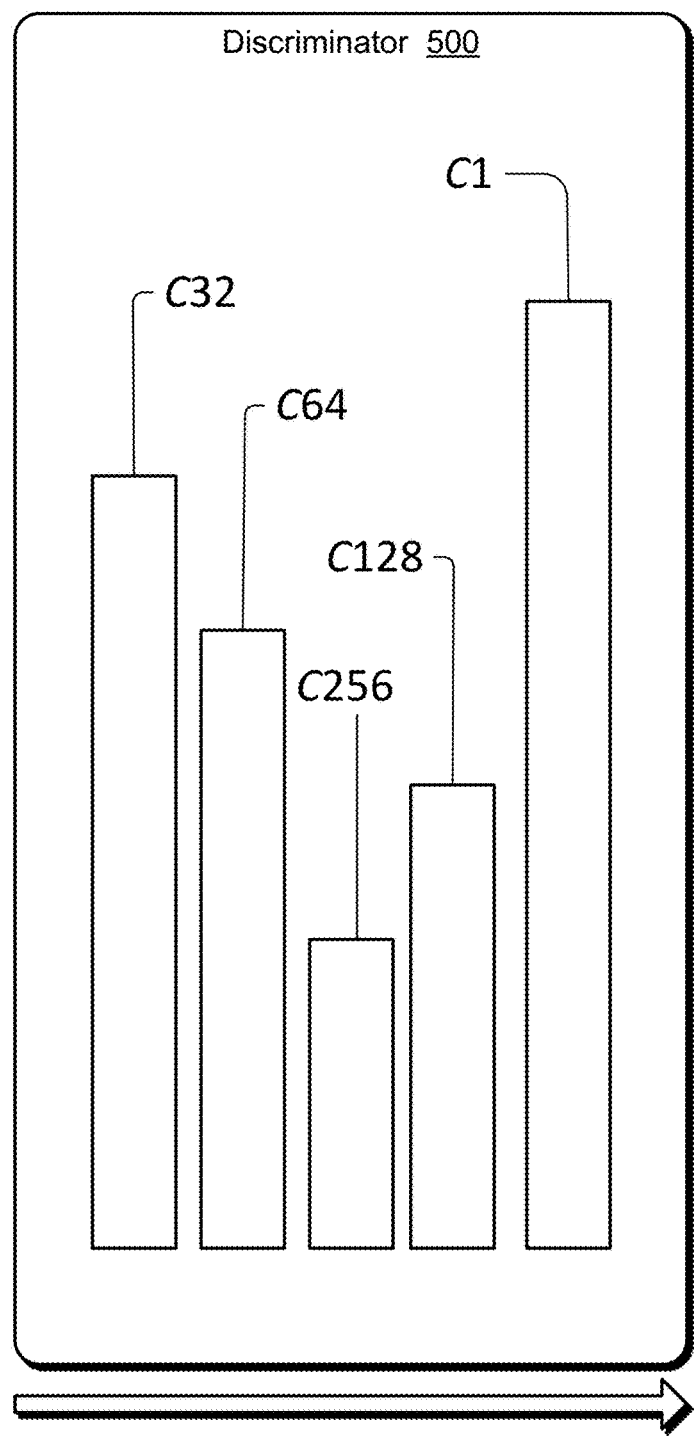
FIG. 5 is a visual representation of an example implementation of a discriminator architecture for the conditional GAN operable to employ the digital image colorization technique.

Referring to FIG. 5, the discriminator 304 may be based on the following architecture:

$$C32\text{-}C64\text{-}C256\text{-}C128\text{-}C1 \quad (3)$$

Similar to the encoder 402 and the decoder 404 above, $C_i k$ denotes a Convolution-BatchNorm-RELU layer with k filters convolved with a stride of i. All convolutions of the discriminator 304 are spatial filters applied with stride 2. The first filter is 9×9, second and third are 5×5 and the remaining are 2×2.

Adversarial training of the conditional GAN 300 may be unstable, especially at the start of training when the generator 302 does not produce anything meaningful and the discriminator 304 may easily distinguish between real and fake images. Training may be stabilized by using initially a weak discriminator. In addition, conditioning the discriminator on the input image is avoided, as this tends to increase the instability.

Figure 6:
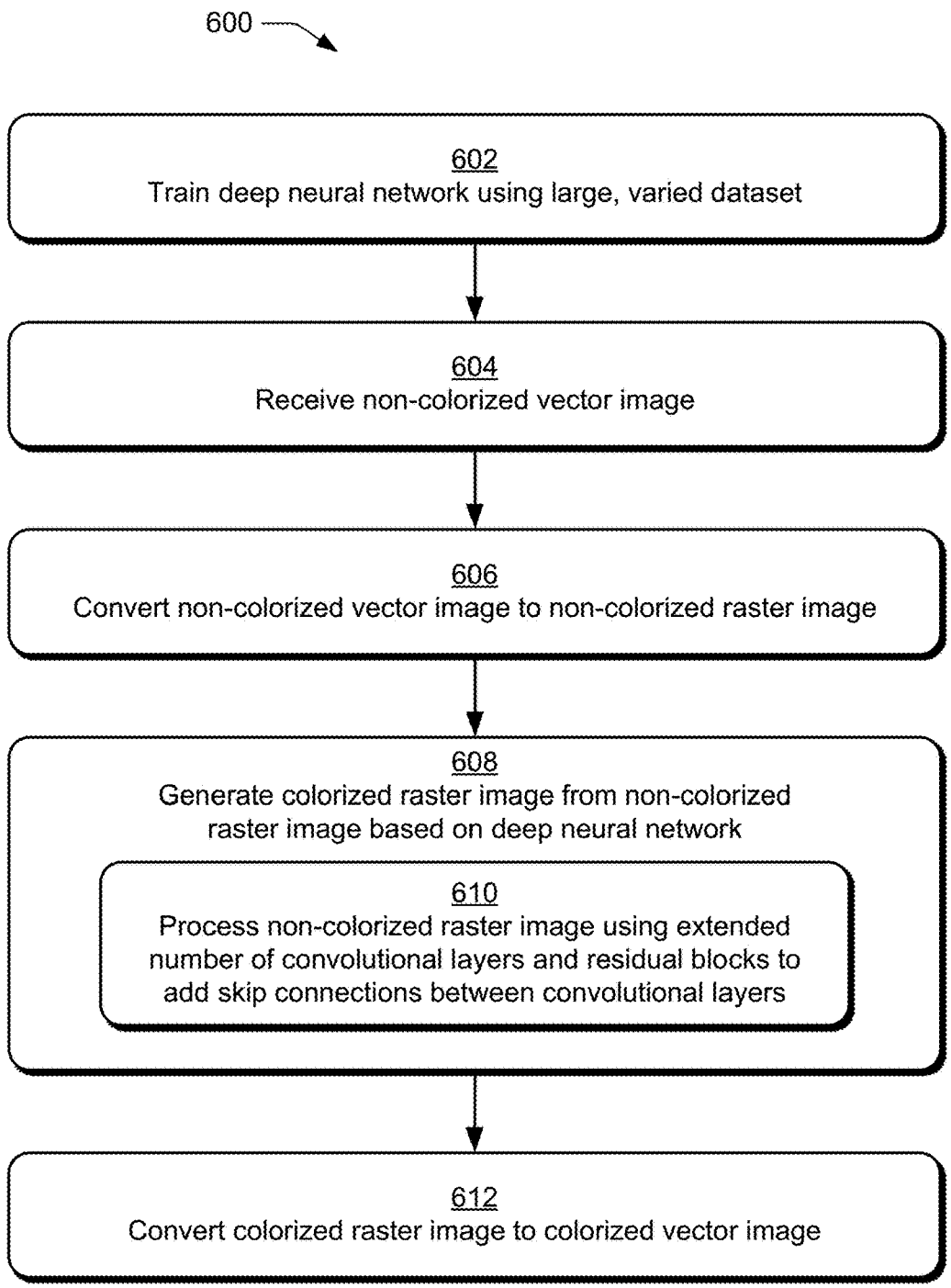
FIG. 6 is a flow diagram depicting a procedure in an example implementation of the digital image colorization technique.

Referring to FIG. 6, the following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The system and method of colorizing vector graphic objects in a digital medium environment is initiated by training deep neural network, as represented by step 602, with have the capability of handling a broad category of real world images, not just a single class such as shoes or faces. The deep neural network is trained using a sufficiently large dataset, as varied as possible, for colorizing vector graphic images. For example, a large dataset of more than a hundred thousand vector files may be used. More detail about the training step is provided below in reference to FIG. 7.

After the deep neural network has been trained for colorizing vector graphic images, the operation of colorizing vector graphic objects may be performed in real time. For example, a user may load a vector graphic object in a drawing or image processing application of a computing device 102 and initiate the process of colorizing the object. Specifically, the non-colorized vector image may be received at the computing device 102, as represented by step 604. As described above, a colorized vector image differs from a non-colorized vector image in that at least one or more elements of the colorized vector image includes more color than the corresponding element or elements of the non-colorized image. An example of a non-colorized vector image would be one that has minimal colors, such as a block outline and a white fill area within the black outline. In contrast to this example non-colorized vector image, a colorized vector image would include one or more other colors in addition to, or in place of, these existing colors.

After receiving the non-colorized vector image, the computing device 102 may convert the non-colorized vector image to a non-colorized raster image, as represented by step 606. For this step, the image is being prepared for colorization by the deep neural network 120 of the colorizing module 108.

After converting the non-colorized vector image to a non-colorized raster image, the computing device 102 may generate a colorized raster image from the non-colorized raster image based on a deep neural network, as represented by step 608. This step of generating the colorized raster image includes processing the non-colorized raster image using an extended number of convolutional layers and residual blocks to add skip connections between at least two of the convolutional layers at a generator 134 of the deep neural network 120, as represented by step 610. For some embodiments, the deep neural network may be a conditional Generative Adversarial Network with a generator, in which the generator includes an encoder having the extended number of convolutional layers and the residual blocks. Due to the significant variation in the input distribution of the digital image colorization technique, it is important to utilize a neural network having deep learning capacity. For example, the deep neural network may be a convolutional neural network having twenty or more convolutional layers in the encoder 402 of the generator 302. Thus, the extended number of convolutional layers may be equal to, or greater than, twenty convolutional layers. Also, since the depth of the network is substantial, the encoder 402 of the generator 302 may further include residual blocks, which add skip connections between convolutional layers to strive for a lower loss and easy flow of gradients, particularly during training.

After generating the colorized raster image from the non-colorized raster image, the computing device 102 may convert the colorized raster image to a colorized vector image, as represented by step 612. For this step, the input vector outline may be utilized to create the colorized vector image.

Figure 7:
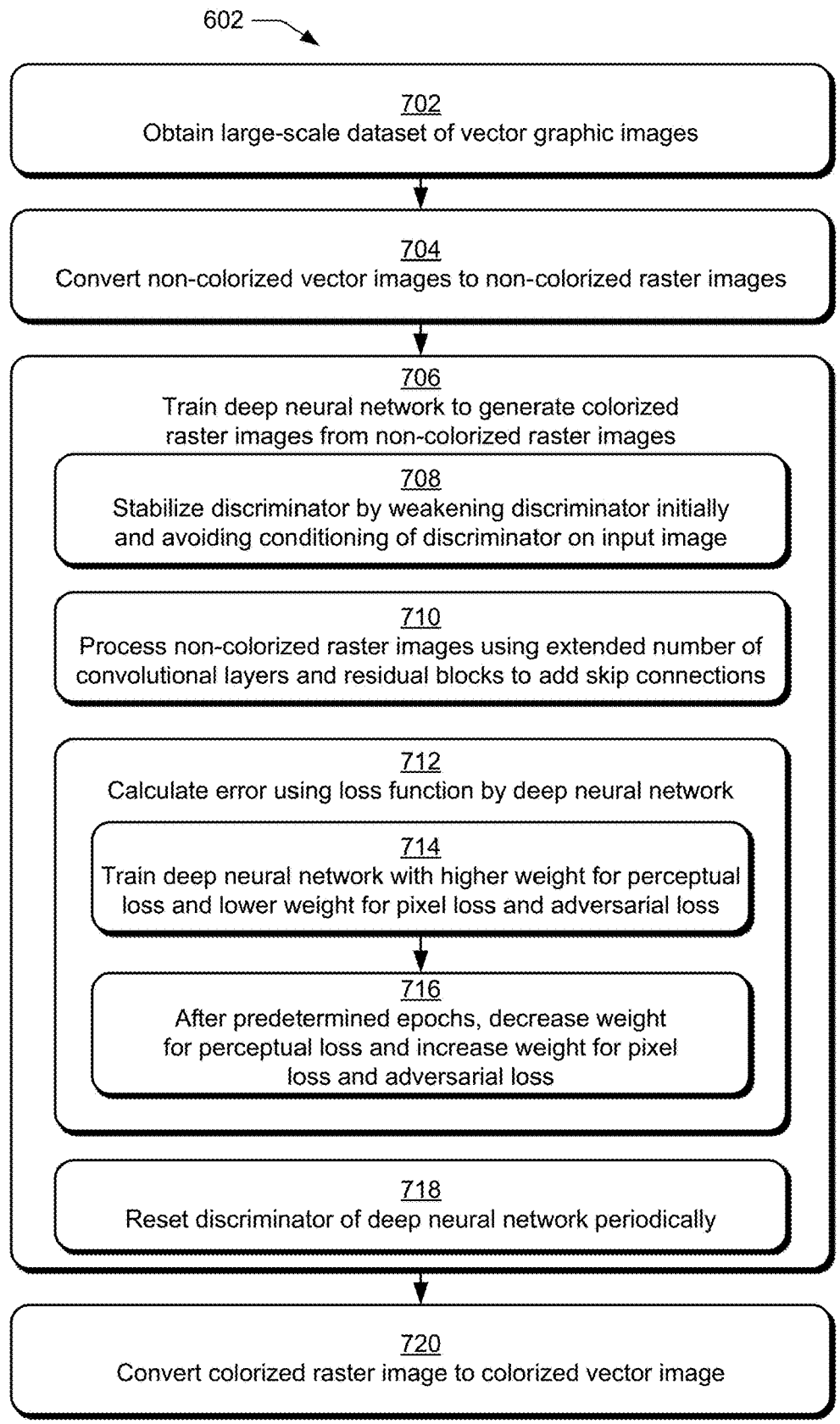
FIG. 7 is a flow diagram depicting a procedure in an example implementation of a training step of the digital image colorization technique.

Referring to FIG. 7, there is shown a procedure in an example implementation of a training step of the digital image colorization technique. FIG. 7, in particular, provides more detail about the operation of training the deep neural network using a large, varied dataset, as represented by step 602 of FIG. 6. One aspect of the training operation is obtaining a large-scale dataset of vector graphic images, as represented by step 702. For training the deep neural network 120, such as a conditional Generative Adversarial Network (GAN), a collection of color images and non-colorized images would be utilized. In some cases, a large varied collection of color images and non-colorized images may not be available. In such case, a large varied collection of color images alone may be helpful, because a corresponding dataset of non-colorized images may be developed from the color images. For example, if one has a dataset containing color raster images of various artworks, then non-colorized outlines may be extracted from the raster images utilizing a variety of techniques and the areas within the outlines may be filled with a white or other singular color. It should be noted that an equal blend from a variety of labelled classes, combined with a remainder of unlabeled images, may provide significant variation in the dataset.

After obtaining a large-scale dataset of non-colorized vector images, the computing device 102 may convert the non-colorized vector images to a non-colorized raster images, as represented by step 704. For this step, the images are being prepared for colorization by the deep neural network 120 of the colorizing module 108.

After converting the non-colorized vector images to a non-colorized raster images, the computing device 102 may train the deep neural network to generate colorized raster images from non-colorized raster images, as represented by step 706. This step of training the deep neural network may include may include stabilizing the discriminator 140 by weakening the discriminator at the initial stage, as represented by step 708. Also, for step 708, conditioning of the discriminator 140 is avoided for the input images, as this tends to increase instability.

Another aspect of the training operation of the deep neural network may include processing the non-colorized raster image using an extended number of convolutional layers and residual blocks to add skip connections between at least two of the convolutional layers at a generator 134 of the deep neural network 120, as represented by step 710. For some embodiments, the deep neural network may be a conditional Generative Adversarial Network with a generator, in which the generator includes an encoder having the extended number of convolutional layers and the residual blocks. Due to the significant variation in the input distribution of the digital image colorization technique, it is important to utilize a neural network having deep learning capacity. For example, the deep neural network may be a convolutional neural network having twenty or more convolutional layers in the encoder 402 of the generator 302. Thus, the extended number of convolutional layers may be equal to, or greater than, twenty convolutional layers. Also, since the depth of the network is substantial, the encoder 402 of the generator 302 may further include residual blocks, which add skip connections between convolutional layers to strive for a lower loss and easy flow of gradients, particularly during training.

Still another aspect of the training operation is calculating an amount of error using loss function by the deep neural network 120, as represented by step 712. This step of calculating the amount of error may include determining a perceptual loss extracted from the deep neural network. The select layers are associated with information about color changes between adjacent faces. For example, the perceptual loss may be extracted from at least layers 2, 7, and 12 of a particular type of deep neural network, such as a Visual Geometry Group network.

Yet another aspect of the training operation is hyperparameter tuning, as represented by steps 714 and 716. Perception loss plays an important role in making the network respect boundaries. Images generated with a high weight for perceptual loss may have an undesirable color (such as bluish tinge) and slow down the convergence rate for the loss function. Thus, training may be initiated with a higher weight for perceptual loss and a lower or relatively low weight for pixel loss and adversarial loss, as represented by step 714. After a predetermined number of epochs, the weight for perceptual loss may be decreased and the weight for pixel loss and adversarial loss may be increased, as represented by step 716. The weight of the perceptual loss is maintained high, and the other hyper-parameters (pixel, adversarial, and total variation) are maintained low (i.e., almost zero), so that, initially, the deep neural network 120 starts to learn to register outlines in the generated output and learns to produce flat fill. Subsequently, the perceptual loss is reduced to a minimum, and the other losses are increased.

An epoch is the stage when the network has seen all of the data once. The number of epochs is relative to the number of training data per epoch. Thus, the predetermined number of epochs may vary, depending on the epoch when the loss no longer converges significantly. For example, the predetermined number of epochs may be within a range of six to ten epochs.

Still yet another aspect of the training operation is resetting the discriminator 140 of the deep neural network 120 periodically, as represented by step 718. For example, the discriminator 140 may be reset within a range of six to ten epochs.

After generating the colorized raster images from the non-colorized raster images, the computing device 102 may subsequently convert the colorized raster images to a colorized vector images, as represented by step 720.

In reference to steps 712, 714, and 716, several sets of losses have been used for the system and process described herein. The simplest and most common loss is the Pixel Loss ($L_{pix}$), i.e., the average per-pixel $L_2$ difference between the generated image and the ground-truth. For more variation and vividness in generated results, Adversarial Loss ($L_{adv}$) may be added to the objective function. Adversarial Loss is the loss that guides the generator 134 and the discriminator 140 altogether. A generative network Go is jointly trained with a discriminative adversarial network Do, so that the discriminator 140 tries to distinguish between the generated images and ground-truth images, while the generator 134 tries to fool the discriminator into thinking the generated result is real. The adversarial loss is defined as:

$$L_{adv} = -\sum_i \log D_\phi(G_\theta(x_i)) \tag{4}$$

Perceptual Loss ($L_p$) may be added to the objective function to benefit image generation. Perceptual Loss may play an important part in making the deep neural network 120 learn outlines and produce solid fills without the outlines. Perceptual Loss ($L_p$) may be defined as the $L_2$ difference in a feature space, where a feature is extracted from a certain layer of a pre-trained neural network representing high level information of images. The generated image may be fed and the outputs may be extracted from earlier layers 2, 7, and 12, where perceptual information is located (combining them). The real ground truth image may be fed to the network, and the output may be extracted from these layers. Also, Total Variation Loss ($L_{tv}$) is a process, most often used in digital image processing, that has applications in noise removal. Total Variation Loss encourages smoothness in the output. In view of the above, the final objective function, i.e., loss function, becomes:

$$\mathcal{L} = w_{pix}L_{pix} + w_{adv}L_{adv} + w_p L_p + w_{tv}L_{tv} \quad (5)$$

As indicated above, the loss function is based on the sum of the weighted values for Pixel Loss, Adversarial Loss, Perceptual Loss, and Total Variation Loss. These hyperparameters control the individual weighting of each of the different losses. In particular, the weight for Pixel Loss is $w_{pix}$, the weight of Adversarial Loss is $w_{adv}$, the weight for Perceptual Loss is $w_p$, and the weight for Total Variation Loss is $w_{tv}$. The neural network 120 is trained by adjusting these weights as training data is fed through the neural network. By carefully fine-tuning these weights individually during testing, the performance of the generator 302 (and the trained generator 318) may be improved, and desirably maximized, to handle a broad category of real world images. In this manner, the neural network 120 is capable of learning, i.e., improving task performance automatically without human intervention, by adjusting the weights based on the loss function, i.e., Total Variation Loss or one or more of its loss parameters.

Example System and Device

Figure 8:
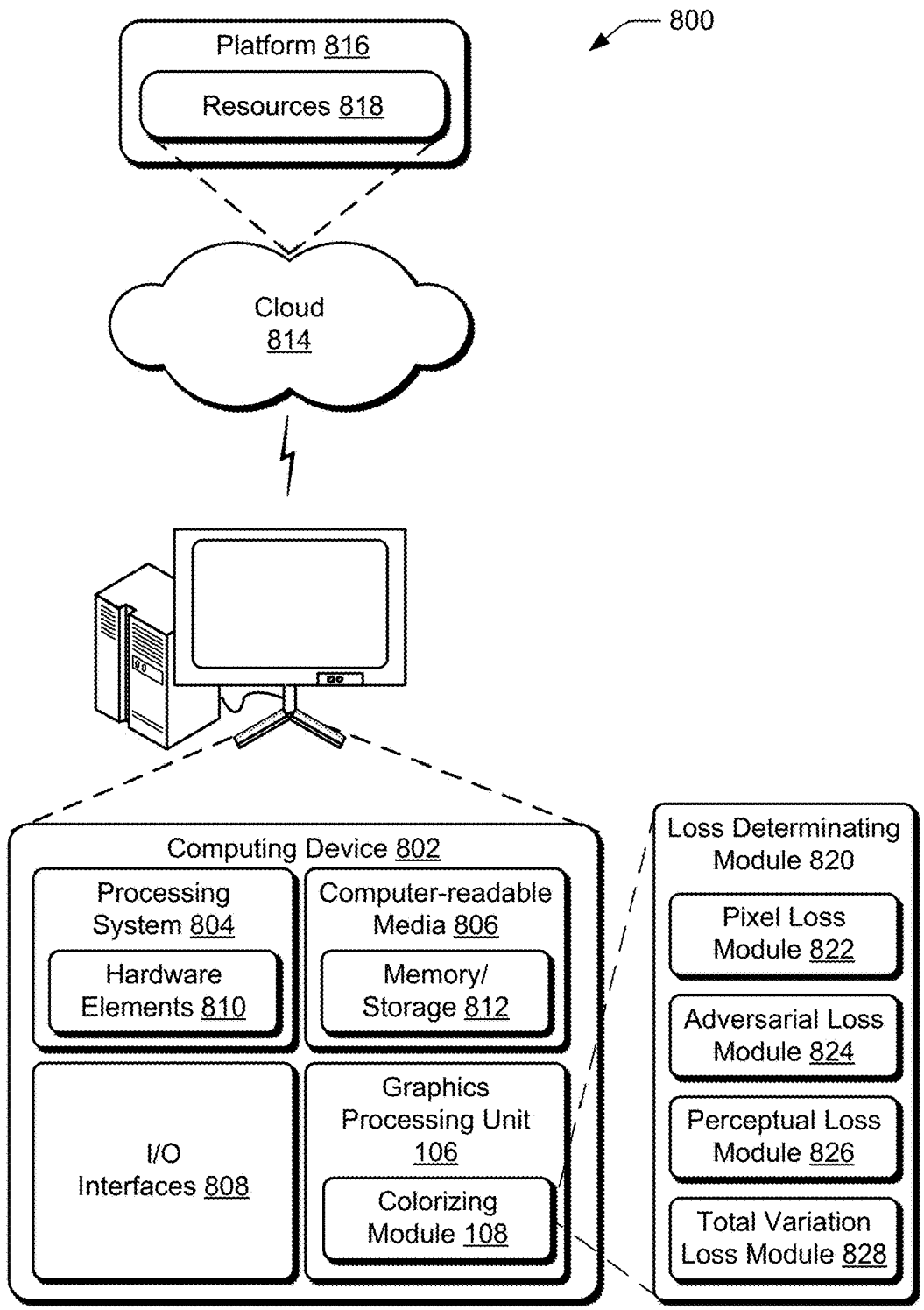
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the colorizing module 108. The computing device 802 may be, for example, a server of a service provider, a device associated with a client (e.g., a client device), an on-chip system, and/or any other suitable computing device or computing system.

For the embodiment shown in FIG. 8, the graphics processing unit 106 of the computing device includes the colorizing module 108. The graphics processing unit 106 is well suited to handle image and video rendering for the colorizing module 108. For other embodiments, the colorizing module 108 may be part of the central processing unit 104 or separate from both the graphics processing unit 106 and the central processing unit. As described above, the tasks may be allocated appropriately between the central processing unit 104 and the graphics processing unit 106, regardless of their arrangement within the computing device 802 relative to the colorizing module 108, to effectively and efficiently provide a desirable experience for the user.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random-access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

The colorizing module 108 may further include modules for identifying degradation in performance, particularly during training of the generator. The colorizing module 108 may include a general loss determining module 820 or multiple loss modules directed to specific aspects of loss. For example, the colorizing module 108 may include, within a general loss determining module 820 or otherwise, a pixel loss module 822, an adversarial loss module 824, a perceptual loss module 826, and/or a total variation loss module 828. Each of these modules may be associated with the corresponding loss functions described above with regard to FIG. 6.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for colorizing vector graphic objects, a method implemented by a computing device, the method comprising:
   receiving a non-colorized vector image;
   converting the non-colorized vector image to a non-colorized raster image;
   generating a colorized raster image from the non-colorized raster image based on a deep neural network by processing, at a generator of the deep neural network, the non-colorized raster image, the deep neural network initially trained with a higher weight for perceptual loss and lower weights for a pixel loss and an adversarial loss and, after a plurality of epochs, decreasing the higher weight for the perceptual loss and increasing the lower weights for the pixel loss and the adversarial loss; and converting the colorized raster image to a colorized vector image.

2. The method of claim 1, wherein the deep neural network is a conditional generative adversarial network comprising the generator, wherein the generator includes an encoder having a plurality of convolutional layers and residual blocks.

3. The method of claim 1, further comprising:
training the deep neural network; and
calculating an amount of error using a loss function with a weight for total variation loss by the deep neural network.

4. The method of claim 3, wherein calculating the amount of error includes determining the perceptual loss extracted from select convolutional layers of the deep neural network.

5. The method of claim 4, wherein the generating the colorized raster image by processing the non-colorized raster image includes using a plurality of the convolutional layers and residual blocks to add skip connections between at least two of the convolutional layers of the deep neural network.

6. The method of claim 5, wherein the plurality of convolutional layers is equal to or greater than twenty convolutional layers of the deep neural network.

7. The method as described in claim 1, further comprising:
training the deep neural network; and
resetting a discriminator of the deep neural network periodically after the plurality of epochs.

8. A system for colorizing vector graphic objects in a digital medium environment comprising:
a processing unit to receive a non-colorized vector image and convert the non-colorized vector image to a non-colorized raster image, and subsequently convert a colorized raster image to a colorized vector image;
a deep neural network of the processing unit initially trained with a higher weight for perceptual loss and lower weights for a pixel loss and an adversarial loss and, after a plurality of epochs, decreasing the higher weight for the perceptual loss and increasing the lower weights for the pixel loss and the adversarial loss; and
the deep neural network of the processing unit implemented to generate the colorized raster image from the non-colorized raster image, the deep neural network including a generator implemented to process the non-colorized raster image.

9. The system of claim 8, wherein the deep neural network is a conditional generative adversarial network comprising the generator, wherein the generator includes an encoder having a plurality of convolutional layers and residual blocks.

10. The system of claim 8, wherein the deep neural network is trained using a dataset comprising one or more classes of images.

11. The system of claim 10, wherein the system calculates an amount of error based on a loss function with a weight for total variation loss during training by the deep neural network.

12. The system of claim 11, wherein the amount of error includes the perceptual loss extracted from select convolutional layers of the deep neural network.

13. The system of claim 12, wherein the generator of the deep neural network is implemented to process the non-colorized raster image using a plurality of the convolutional layers and residual blocks to add skip connections between at least two of the convolutional layers of the deep neural network.

14. The system of claim 13, wherein the plurality of convolutional layers is equal to or greater than twenty convolutional layers.

15. The system of claim 11, wherein the deep neural network is initially trained with an additional lower weight for the total variation loss.

16. The system of claim 15, wherein the additional lower weight for the total variation loss is increased after a plurality of epochs.

17. The system of claim 10, wherein a discriminator of the deep neural network is reset periodically during training.

18. In a digital medium environment for colorizing vector graphic objects, a method implemented by a computing device, the method comprising:
training a neural network initially with a higher weight for perceptual loss and lower weights for a pixel loss and an adversarial loss and, after a plurality of epochs, decreasing the higher weight for the perceptual loss and increasing the lower weights for the pixel loss and the adversarial loss;
receiving a non-colorized vector image;
converting the non-colorized vector image to a non-colorized raster image;
generating a colorized raster image from the non-colorized raster image based on the neural network; and
converting the colorized raster image to a colorized vector image.

19. The method as described in claim 18, wherein training the neural network includes determining the perceptual loss extracted from select convolutional layers of the neural network.

20. The method as described in claim 18, wherein training the neural network includes resetting a discriminator of the neural network periodically.

* * * * *